United States Patent [19]

Lukáš et al.

[11] 4,340,483

[45] Jul. 20, 1982

[54] POLAR POLYMERIC SORBENT BASED ON GLYCIDYL ESTERS FOR GAS AND LIQUID CHROMATOGRAPHY

[75] Inventors: Jaromír Lukáš; Jaroslav Kálal, both of Prague; František Švec, Kladno, all of Czechoslovakia

[73] Assignee: Ceskoslovenska akademie ved, Prague, Czechoslovakia

[21] Appl. No.: 863,936

[22] Filed: Dec. 23, 1977

[30] Foreign Application Priority Data

Jan. 19, 1977 [CS] Czechoslovakia ............... 372/77

[51] Int. Cl.$^3$ ................................................ B01D 15/08
[52] U.S. Cl. ..................................... 210/502; 55/386; 210/198.2; 526/320; 526/321
[58] Field of Search ............... 55/386; 210/198 C, 502; 526/320–325

[56] References Cited

U.S. PATENT DOCUMENTS

| | | | |
|---|---|---|---|
| 3,478,886 | 11/1969 | Hornbeck | 210/198 C |
| 3,925,267 | 12/1975 | Coupek et al. | 526/320 |
| 3,935,173 | 1/1976 | Ogasawara et al. | 526/321 X |
| 4,042,645 | 8/1977 | Hirota et al. | 526/320 X |
| 4,076,921 | 2/1978 | Stol et al. | 526/320 X |

*Primary Examiner*—John Adee

[57] ABSTRACT

The invention relates to the polar polymeric sorbent applicable in gas and liquid chromatography, which is based on glycidyl esters. The sorbent is formed by the macroporous copolymer containing 3–70% of polymerized monomeric units with epoxy groups, e.g. glycidyl methacrylate or glycidyl acrylate units, and 97–30% of a crosslinking agent, e.g. alkylene dimethacrylate, alkylene diacrylate, hydroxyalkylene dimethacrylate, hydroxyalkylene diacrylate (alkylene containing 1–6 C atoms), or divinylbenzene. The sorbent may further contain up to 30% of polymerized monomeric units containing nitrile groups, e.g. acrylonitrile and methacrylonitrile units. The polarity of sorbent can be further modified, according to the invention, by the reaction with various nucleophilic agents, e.g. water, alcohols, carboxylic acids and their derivatives, ammonia, amines, thioalcohols, acrylonitrile. The sorbent is thermally and mechanically stable and was used for the gas-chromatographic and liquid-chromatographic separation of complex mixtures of compounds. Its polarity was expressed in terms of modified Rohrschneider indices.

2 Claims, No Drawings

POLAR POLYMERIC SORBENT BASED ON GLYCIDYL ESTERS FOR GAS AND LIQUID CHROMATOGRAPHY

The invention relates to the polar polymeric sorbent based on glycidyl esters and suitable for gas and liquid chromatography, which enables through its properties the chromatographic separation of mixtures of various compounds.

In the early seventies, polymeric sorbents were introduced for application in gas chromatography in the connection with advancement in production of macroporous polymers. They are of use, above all, in the gas-solid chromatography. Most of the commercially available sorbents of this type are produced on the basis of styrene-divinylbenzene copolymers. Its substance is, however, close to non-polar anchored phases. This means that their polarity is relatively low. The polarity measure of anchored phases is expressed in literature, as a rule, in terms of Rohrschneider constants (J. Chromatog. 22, 6, 1966); i.e. by 0.01 times the difference of retention indices of benzene (x), ethanol (y), methyl ethyl ketone (z), nitromethane (u), and pyridine (s) on squalane and the retention indices of these compounds on the given anchored phase. Because relating of retention indices to the anchored phase is not completely correct in the case of gas-solid chromatography, the retention indices on squalane were substituted by the indices of the same standards measured at 150° C. on the non-polar sorbent Carbopack B-T-M for a graphitized carbon black (product of Supelco, Inc.) and this calculated modified values of Rohrschneider constants were designed $x'$, $y'$, $z'$, $u'$, and $s'$.

One of the most polar sorbents at present in market is Porapak T, T-M for product of Waters Associates Inc. which has the Rohrschneider constants $x'=1.30$, $y'=2.90$, $z'=2.21$, $u'=3.44$ ($s'$ was not determined) and is the homopolymer of ethylene dimethacrylate. The polarity extent of some polymeric sorbents may be extended by subsequent modification, nevertheless it is too small and the sorbents can be used above all for separation of non-polar compounds.

The application of sorbents based on hydroxyalkyl methacrylate or acrylate gels, according to the Czechoslovak Pat. No. 159,990 (corresponding to British Pat. No. 1,445,137; Canadian Pat. No. 1,006,292; and U.S. patent application Ser. No. 788,978 abandoned), and on their modification products renders broader prospects. These sorbents attain the values of Rohrschneider constants $x'=2.29$, $y'=3.53$, $z'=2.75$, $u'=4.09$ ($s'$ was not determined). An enhancement of polarity may be also achieved by the ternary copolymerization of polar monomers, as hydroxyalkyl acrylate or methacrylates, with a non-polar monomer of the alkyl acrylate or methacrylate type and a crosslinking agent, according to the Czechoslovak Pat. No. 175 156 (corresponding to U.S. patent application Ser. No. 705,422 now U.S. Pat. No. 4,135,892). The sorbent prepared in this way has Rohrschneider constants $x'=1.73$, $y'=3.24$, $z'=2.63$, $u'=3.95$, and $s'=3.54$.

However, the above mentioned materials do not possess the sufficient polarity for separation of some mixtures.

The objective of this invention is the polar polymeric sorbent based on glycidyl esters which is suitable for gas and liquid chromatography and consists of the macroporous copolymer containing 3-70% of polymerized monomeric units with epoxy groups, advantageously glycidyl methacrylate—i.e. 2,3-epoxypropyl methacrylate—and glycidyl acrylate, 97-30% of a crosslinking agent, as alkylene diacrylate, alkylene dimethacrylate, hydroxyalkylene dimethacrylate, hydroxyalkyl diacrylate, where alkylene comprises 1-6 carbon atoms, divinylbenzene, and the like, and, if desired, also up to 30% of polymerized monomeric units with nitrile groups, as acrylonitrile or methacrylonitrile.

Further types of the polar polymeric sorbent are obtained by the easy modification of epoxy groups with a nucleophilic agent, as water, carboxylic acids or their derivatives, ammonia, primary and secondary amines, mercapto compounds, and others.

The materials according to the invention are used as packings for columns in the gas and liquid chromatography. They are prepared in a broad region of porosity and polarity by a suspension radical polymerization, e.g. according to the Czechoslovak Pat. No. 175 112 (corresponding to British Pat. No. 1,512,462). Their convenient sorption properties are documented by the linear shape of adsorption isotherms and the corresponding peak symmetry of separated compounds. The mechanical and volume stability with changing medium and temperature is exceptionally good. Also the retention times of compounds separated on the sorbent according to the invention are substantially shorter in comparison with known sorbents and the separations can be generally carried out at lower temperatures.

The invention is further illustrated in examples of performance, without limiting its scope by any means.

EXAMPLE 1

The sorbent was prepared in a polymerization vessel of 1 liter volume from 600 ml of 1% aqueous solution of polyvinylpyrrolidone and the mixture consisting of 9.6 g of dodecanol, 98.8 g of cyclohexanol, 49.2 g glycidyl methacrylate, 32.8 g of ethylene dimethacrylate, and 0.80 g of 2,2'-azobis(isobutyronitrile). The batch was bubbled through with a stream of nitrogen for 15 minutes, the reactor was then closed and agitation was set off (250 r.p.m.). After five minutes of stirring, the mixture was heated to 70° C. The copolymerization proceeded at this temperature for 2 hours and at 80° C. for further 6 hours. After the reaction has been completed, the product was separated and washed by decantation with ethanol (twice), benzene (twice), and again with ethanol (twice).

For the chromatographic purpose, the copolymer was extracted with ethanol for 4 hours, dried in a vacuum oven, and fractionated. The fraction of particle size 150–200 $\mu$m was used for packing of the glass column 120 cm long and of inner diameter 0.3 cm. The packing was first conditioned at 170° C. in the nitrogen stream 20 ml/min. for 24 hours. The values of modified Rohrschneider indices of the sorbent are: $x'=2.02$, $y'=3.65$, $z'=2.96$, $u'=4.75$, $s'=3.93$. The separation of 0.2 $\mu$l of the mixture of $C_7$–$C_{12}$ alkanes was carried out at temperature 175° C. and argon through-flow 24 ml/min.

Retention times of individual hydrocarbons were as follows: heptane 1.28 min, octane 1.58 min, nonane 3.15 min, decane 5.15 min, undecane (b.p. 194° C.) 8.45 min, dodecane (b.p. 214.5° C.) 14.30 min.

EXAMPLE 2

The separation of 0.15 $\mu$l of alcohols on the sorbent according to Example 1 was carried out at temperature 140° C. and argon through-flow 25 ml/min. Retention times of individual components: methanol 1.48 min, ethanol 2.64 min, isopropyl alcohol 3.40 min, tert-butanol 4.29 min, propanol 4.96 min, isobutanol 7.98 min, butanol 9.87 min, 3-methylbutanol (b.p. 132° C.) 17.30 min, pentanol (b.p. 137.9° C.) 20.00 min.

EXAMPLE 3

The successful separation of the mixture of methyl to hexyl esters of acetic acid on the sorbent according to Example 1 was carried out at temperature 175° C. and argon through-flow 25 ml/min. Retention times of individual esters: methyl acetate 1.38 min, ethyl acetate 1.93 min, tert-butyl acetate 2.75 min, butyl acetate 4.43 min, pentyl acetate 7.65 min, hexyl acetate (b.p. 169.2° C.) 12.21 min.

EXAMPLE 4

The mixture (0.1 μl) of vinyl hexyl ether, hexanol, cyclohexanol, and 2-methylcyclohexanol was injected into the column packed with the sorbent according to Example 1 at the column temperature 175° C. and the through-flow of carrier gas 25 ml/min. The following retention times of individual components are the evidence of successful gaschromatographic separation: vinyl hexyl ether 5.12 min, hexanol 9.45 min, cyclohexanol 12.48 min, 2-methylcyclohexanol (b.p. 166° C.) 15.83 min.

EXAMPLE 5

The mixture of cyclopentanone, cyclohexanone and 2-methylcyclohexanone was separated under the same conditions as in Example 4. The retention times were: cyclopentanone 6.87 min, cyclohexanone 12.33 min and 2-methylcyclohexanone 14.65 min.

EXAMPLE 6

The mixture (0.2 μl) of compounds with different functional groups and of very similar boiling points was injected into the column packed with the material according to Example 1 at temperature 115° C. and the through-flow of argon 25 ml/min. The retention times of components were as follows: ethanol (b.p. 78.4° C.) 5.89 min, 1-chlorobutane (b.p. 77.9° C.) 9.32 min, ethyl acetate (b.p. 77.1° C.) 11.55 min, methyl ethyl ketone (b.p. 79.6° C.) 13.15 min.

EXAMPLE 7

The copolymer was prepared in the same way as in Example 1 with the distinction that the weights of monomer and crosslinking agent were 24.6 g of glycidyl methacrylate and 57.4 g of ethylene dimethylacrylate. The copolymer was extracted, used for packing of a column (120 cm×0.3 cm), and conditioned in the same way as in Example 1. The relatively lower polarity predeterminates this sorbent above all for separation of compounds which differ in the number of free $\pi$-electrons (olefins, cycloolefins, aromatic hydrocarbons), but it can be used also for separation of other types of compounds. The values of modified Rohrschneider constants are as follows: $x'=1.05$, $y'=2.37$, $z'=1.89$, $u'=2.92$ ($s'$ was not determined). The mixture (0.1 μl) of cyclohexane, cyclohexene and benzene was separated at temperature 132° C. and the through-flow of argon 25 ml/min. Retention of these compounds is affected by the number of free $\pi$-electrons in the molecule: cyclohexane (b.p. 80°–81° C.) 12.33 min, cyclohexene (b.p. 83.3° C.) 14.42 min, benzene (b.p. 80.1° C.) 18.23 min.

EXAMPLE 8

Successful separation of 0.1 μl of the mixture of cycloalkanes and equally substituted aromatic hydrocarbons was carried out similarly as in Example 7, at temperature 172° C. and the through-flow of argon 25 ml/min. The retention times of individual components were as follows: cyclohexane 5.70 min, benzene 7.91 min, methylcyclohexane 10.23 min, toluene 16.72 min, ethylcyclohexane 22.6 min, ethylbenzene 34.42 min.

EXAMPLE 9

The sorbent was prepared by the same procedure as in Example 1, with the distinction that the monomer mixture consisted of 32.8 g of glycidyl methacrylate, 16.4 g of acetonitrile, and 32.8 g of ethylene dimethacrylate. Also the preparation of terpolymer for its chromatographic application, packing of the column which had the same parameters, and conditioning of the packing were carried out in the same way. This sorbent exhibits the thermal stability up to 270° C. and has a strong polar character. The values of modified Rohrschneider indices are as follows: $x'=3.62$, $y'=4.64$, $z'=4.43$, $u'=7.00$, $s'=5.97$. A mixture of 0.2 μl of polar compounds was separated at 108° C. and the through-flow of argon 25 ml/min. Individual compounds had the following retention times: diethyl ether 2.76 min, methanol 4.39 min, ethanol 7.14 min, acetone 8.37 min, methyl ethyl ketone 16.90 min.

EXAMPLE 10

The mixture of carboxylic acids (0.3 μl) was separated on the column packed with the material according to Example 9 at column temperature 170° C. and the through-flow of argon 25 ml/min. The reaction times were: acetic acid 5.57 min, propionic acid 7.79 min, isobutyric acid 9.02 min, butyric acid 11.45 min, valeric acid (b.p. 187° C.) 18.37 min.

EXAMPLE 11

The copolymer according to Example 1 was modified by hydrolysis and the subsequent cyanoethylation in the following way: 50 g of the copolymer was stirred in a threefold volume of 1 N aqueous sulfuric acid and the hydrolysis was carried out at 90° C. for 1 hour; 5 g of the hydrolyzed sample was shaken with 15 ml of acrylonitrile and 15 ml of 9 N sodium hydroxide solution at 25° C. for 4 hours. The product was then washed with water until the alkaline reaction ceased and dried in a vacuum oven. The column of 1 m length and 0.35 mm inner diameter was packed with this modified copolymer and conditioned at temperature 180° C. in the stream of nitrogen 20 ml/min for hours. This sorbent has also a strongly polar character and broad application possibilities. The values of modified Rohrschneider constants are as follows: $x'=2.71$, $y'=5.14$, $z'=4.29$, $u'=7.13$, $s'=5.81$.

A mixture (0.1 μl) of chlorinated hydrocarbons was separated at the column temperature 150° C., injection temperature 190° C., and through-flow of nitrogen 30 ml/min. The retention times of individual compounds were: 1-chlorobutane 1.10 min, 1.3-dichlorobutane 4.08 min, 1,4-dichlorobutane 7.08 min.

EXAMPLE 12

The mixture (0.1 μl) of trichlorobenzenes was separated on the sorbent according to Example 11 at the column temperature 190° C., injection temperature 230°

C., and through-flow of nitrogen 30 ml/min. The individual isomers had the following retention times: 1,3,5-trichlorobenzene 3.52 min, 1,2,4-trichlorobenzene 5.21 min, 1,2,3-trichlorobenzene (b.p. 218°–219° C.) 6.80 min.

EXAMPLE 13

Separation of $C_2$–$C_5$ carboxylic acids was carried out under the following conditions: the sorbent according to Example 11, column temperature 165° C., injection temperature 220° C., through-flow of nitrogen 30 ml/min, injected volume 0.15 μl. The retention times obtained: acetic acid 5.20 min, propionic acid 6.74 min, butyric acid 4.19 min, valeric acid 13.90 min.

EXAMPLE 14

Successful gas-chromatographic separation of the mixture of compounds with different functional groups was carried out on the sorbent according to Example 11 under the following conditions: column temperature 90° C., injection temperature 130° C., injected volume 0.1 μl, through-flow of nitrogen 30 ml/min. The individual compounds left the column in the following order: 1-chlorobutane 4.36 min, ethanol 6.48 min, butyraldehyde 7.60 min, methyl ethyl ketone 10.70 min.

EXAMPLE 15

The polymeric sorbent according to Example 1 was modified by heating in the 0.5 N aqueous solution of perchloric acid for 2 hours at 90° C. It was then separated, washed until the acid reaction ceased, extracted with ethanol for 4 hours and dried. For application, it was packed into a column and conditioned. The values of modified Rohrschneider indices are: $x'=2.93$, $y'=5.24$, $z'=4.64$, $u'=5.52$, $s'=$ was not determined. The sorbent was successfully employed for separation of polar compounds by the gas-chromatographic method.

EXAMPLE 16

The polymer according to Example 1 was heated with the 50% solution of 2-hydroxyethylamine to 60° C. for 6 hours. Then it was washed with water, extracted with ethanol, dried, and packed into a column. The sorbent exhibited the following values of modified Rohrschneider indices: $x'=3.23$, $y'=6.12$, $z'=4.74$, $u'=6.83$, $s'=6.53$ and was also successfully used for separation of polar compounds by gas chromatography.

EXAMPLE 17

The copolymer glycidyl methacrylate-ethylene dimethacrylate was prepared according to Example 1, with the distinction that the monomer mixture consisted of 70% of glycidyl methacrylate and 30% of ethylene dimethacrylate and that the mixture was agitated during polymerization more vigorously (700 r.p.m.). The fraction of particles with diameter of 15–20 μm was separated from the resulting product, thoroughly dried and modified in the following way: 5 g of the copolymer was dispersed in 20 ml of stearoyl chloride and shaken at 20° C. for 4 hours, at 70° C. for 1.5 hours, and at 80° C. for 6 hours. The product after stearoylation contained 5.60% of chlorine. The column 200×8 mm was packed with this sorbent and used for separation of the mixture of aromatic hydrocarbons (benzene, diphenyl, anthracene, chrysene, and benzopyrene) by the method of liquid chromatography.

Further sorbents were prepared analogously to Example 1 from the monomer mixtures and under conditions given in the following examples (in Examples 18–24 the monomer mixtures and r.p.m. were distinct).

EXAMPLE 18

Glycidyl acrylate 24.6 g, 2-hydroxypropylene diacrylate 32.8 g, methacrylonitrile 24.6 g; 300 r.p.m.

EXAMPLE 19

Glycidyl acrylate 20.5 g, 2,3,4,5-tetrahydroxyhexamethylene dimethacrylate 61.5 g; 1500 r.p.m.

EXAMPLE 20

Glycidyl methacrylate 49.2 g, 2,3-dihydroxytetramethylene dimethacrylate 32.8 g; 350 r.p.m.

EXAMPLE 21

Glycidyl methacrylate 8.2 g, tetramethylene diacrylate 73.8 g; 250 r.p.m.

EXAMPLE 22

Glycidyl methacrylate 16.4 g, divinylbenzene 65.6 g; 1800 r.p.m.

EXAMPLE 23

Glycidyl methacrylate 2.5 g, ethylene dimethacrylate 79.5 g; 250 r.p.m.

EXAMPLE 24

Glycidyl methacrylate 41.0 g, ethylene dimethacrylate 32.8 g; acrylonitrile 4.1 g; 250 r.p.m.

EXAMPLE 25

The copolymer prepared according to Example 1 was modified in the following way: Into a vessel equipped with a tight closure, containing 15 g of the copolymer, 10 g of dimethylamine was distilled under intense cooling. The vessel was sealed and its content was heated to 60° C. for 2 hours. After cooling, the vessel was opened, unreacted amine volatilized, and the sorbent, containing 2.23 mmol amino groups per g, was packed into a column. After conditioning in the stream of nitrogen at 180° C., the gas chromatographic separation of mixtures comprising alcohols, hydrocarbons and esters of carboxylic acids were carried out.

EXAMPLE 26

The sorbent containing SH-groups were prepared from the copolymer formed according to Example 22 (fraction of particle size 5–20 μm) by the procedure described in Example 25, with the distinction that hydrogen sulfide was distilled instead of amine into the reaction vessel. It was packed into a column and used for separation of a mixture of natural compounds by the method of liquid chromatography.

EXAMPLE 27

The copolymer according to Example 1 (20 g) was placed on a glass flask equipped with a reflux condenser and a stirrer and 50 ml of aqueous ethylene diamine solution (75% w/w) was added. The mixture was stirred at temperature 80° C. for 6 hours, the solid phase was collected on a fritted glass filter and washed with 0.1 N NaOH (1 liter) for 4 hours and with water until the alkaline reaction ceased. After drying, the product was packed into a column, conditioned, and used for the gas-chromatographic separation of a mixture consisting of polar and nonpolar compounds. The sorbent is thermally stable up to 210° C. The values of modified Rohrschneider indices are as follows: $x'=2.89$, $y'=6.40$, $u'=6.98$, $s'=6.54$.

EXAMPLE 28

The sorbent containing 2.20 mmol nitrogen/g was prepared by the analogous procedure as in Example 27 by the reaction with methylamine instead of ethylenediamine. It was thermally stable up to 200° C. and was employed for the gas-chromatographic separation of mixtures of compounds. The values of modified Rohrschneider indices are as follows: $x'=2.13$, $y'=4.67$, $z'=3.52$, $u'=4.84$, $s'=4.80$.

EXAMPLE 29

The polymer prepared according to Example 17, the fraction of particle size 5–20 μm, was reacted with dodecylamine by the same procedure as in Example 27 and used as the packing for separation of nonpolar hydrocarbons by the method of liquid chromatography.

EXAMPLE 30

The polymer prepared according to Example 19 was modified by the same procedure as in Example 27 using 2-mercaptoethanol as the substrate. The product was employed for separation of natural compounds by the method of liquid chromatography.

EXAMPLE 31

The sorbent was prepared by the same procedure as in Example 1, with the distinction that the monomer mixture consisted of 24.8 g of glycidyl methacrylate, 24.6 g of acrylonitrile, and 32.8 g of ethylene dimethacrylate. The product after polymerization was prepared for application by screening, packing of a column and conditioning as in Example 1. The mixture of diols (0.1 μl) was separated on the column at 195° C. and the through-flow of nitrogen 27 ml/min. The retention times of individual components were as follows: 1-butanol 1.25 min, ethylene glycol monomethacrylate 1.80 min, diethylene glycol diethyl ether 3.66 min, 2,3-butanediol 5.80 min, ethylene glycol 6.50 min, 1,3-propanediol 11.50 min, benzylalcohol 15.76 min.

EXAMPLE 32

Separation of trichlorobenzene isomers was carried out on the same packing and under the same conditions as in Example 31. The retention times of individual components were as follows: 1,3,5-trichlorobenzene 5.10 min, 1,2,4-trichlorobenzene 6.94 min, 1,2,3-trichlorobenzene 9.66 min.

EXAMPLE 33

The sorbent prepared according to Example 31, with the distinction that the same amount of methacrylonitrile was used instead of acrylonitrile, was subjected to the acid hydrolysis of epoxide groups by heating to 80° C. in 0.5 M sulfuric acid for 2 hours. The product was washed with water until the acidic reaction ceased and dried. After packing into a column and conditioning, separation of 0.15 μl of the mixture of carboxylic acids was carried out at temperature 170° C. and the through-flow of nitrogen 27 ml/min. The retention times of individual components were as follows: acetic acid 7.22 min, propionic acid 10.42 min, valeric acid 27.02 min.

We claim:

1. The polar polymeric sorbent based on glycidyl esters suitable for gas and liquid chromatography, which consists of the macroporous copolymer containing 3–70 percent of polymerized monomeric units with epoxy groups selected from the group consisting of glycidyl methacrylate and glycidyl acrylate, 97–30 percent of a crosslinking agent selected from the group consisting of alkylene diacrylate, alkylene dimethacrylate, hydroxyalkylene diacrylate, hydroxyalkylene dimethacrylate, where the alkylene contains 1–6 carbon atoms, and divinylbenzene, and 0 to 30 percent of polymerized monomeric units with nitrile groups selected from the group consisting of acrylonitrile and methacrylonitrile.

2. The polar polymeric sorbent according to claim 1, wherein the macroporous copolymer, which contains polymerized monomeric units with epoxy groups, is modified by a nucleophilic agent selected from the group consisting of water, hydrogen sulfide, alcohols, carboxylic acids and acyl chlorides, ammonia, primary and secondary amines, mercapto compounds, perchloric acid and acrylonitrile.

* * * * *